US011050630B2

(12) United States Patent
AbiEzzi et al.

(10) Patent No.: US 11,050,630 B2
(45) Date of Patent: Jun. 29, 2021

(54) INTERNET OF THINGS MANAGEMENT THROUGH SELF-DESCRIBING OBJECTS

(71) Applicant: VMware, Inc., Palo Alto, CA (US)

(72) Inventors: Salim AbiEzzi, Sammamish, WA (US); Gregory Bollella, Redwood City, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/446,333

(22) Filed: Jun. 19, 2019

(65) Prior Publication Data
US 2020/0403871 A1    Dec. 24, 2020

(51) Int. Cl.
*H04L 12/24* (2006.01)
*H04L 29/08* (2006.01)

(52) U.S. Cl.
CPC .............. *H04L 41/12* (2013.01); *H04L 67/12* (2013.01)

(58) Field of Classification Search
CPC ................................ H04L 41/12; H04L 67/12
See application file for complete search history.

(56) References Cited

U.S. PATENT DOCUMENTS

| 10,423,917 B2 * | 9/2019 | Said | G06Q 10/067 |
| 2008/0281472 A1 * | 11/2008 | Podgorny | G05B 15/02 700/276 |
| 2014/0289366 A1 * | 9/2014 | Choi | G06F 9/4451 709/218 |
| 2016/0006815 A1 * | 1/2016 | Dong | H04L 67/06 709/204 |
| 2019/0095520 A1 * | 3/2019 | Park | G06F 16/9024 |
| 2020/0162410 A1 * | 5/2020 | Hood | H04L 51/36 |
| 2020/0374700 A1 * | 11/2020 | Smith | H04L 9/3247 |

OTHER PUBLICATIONS

S. Kim, H. Choi and W. Rhee, "IoT home gateway for auto-configuration and management of MQTT devices," 2015 IEEE Conference on Wireless Sensors (ICWiSe), Melaka, 2015, pp. 12-17. (Year: 2015).*
Wang, Jiying & Wen, Ji-Rong & Lochovsky, Frederick & Ma, Wei-Ying . . . Instance-based Schema Matching for Web Databases by Domain-specific Query Probing. VLDB. 408-419. (Year: 2004).*

* cited by examiner

*Primary Examiner* — John M MacIlwinen
(74) *Attorney, Agent, or Firm* — Thomas | Horstemeyer, LLP.; Jason M. Perilla

(57) ABSTRACT

The management of internet of things (IoT) objects through a self-describing interoperability framework is described. In one example, an IoT object can be registered with an IoT device management system. The IoT device management system can then query the IoT object for a self-describing declaration. The self-describing declaration can include a schema that defines certain operating and interface parameters for the IoT object. The IoT device management system can parse the self-describing declaration to determine, for example, both normal or expected and abnormal or pathologic data from the IoT device. The self-describing declaration can also define function call parameters to establish an interoperability framework between the IoT device management system and the IoT object. Based on such self-describing declarations from various IoT objects, a number of different IoT objects can be easily recognized, integrated with, and managed by the IoT device management system.

20 Claims, 4 Drawing Sheets

INTERNET OF THINGS MANAGEMENT THROUGH SELF-DESCRIBING OBJECTS

BACKGROUND

The internet of things (IoT) extends data connectivity to common, everyday devices, including various types of equipment, machinery, tools, appliances, security systems, cameras, thermostats, and other devices. With embedded physical layer communications interfaces, sensors, and other forms of hardware and software, IoT objects or devices can form a group of peers that can communicate and interact with each other and other services over computer networks. In many implementations, IoT objects can be remotely controlled and monitored to gather data and achieve efficiencies.

Today, the concept of IoT includes a combination of data gathering, aggregation, analytics, machine learning, artificial intelligence, remote object control, remote object administration and management, and alerting for large numbers of IoT objects. IoT technology is being adopted by consumers to implement smart home systems, which provide new ways to control and receive notifications from home appliances, light fixtures, thermostats, home security systems, smoke detectors, water detectors, and other devices. IoT technology is also being adopted by manufacturers, service providers, utility companies, retailers, and transporters, among others, to provide data insights for logistics and planning purposes.

However, the scale of IoT implementations can present a number of issues. For example, the number of IoT objects or devices to administer can be significantly larger than, for example, the number of conventional computing devices deployed in an enterprise environment. The management of these IoT objects, including the need to onboard the IoT objects, gather, aggregate, and analyze data from the IoT objects, deploy software updates and security patches to the IoT objects, and update configurations or settings on the IoT objects, can strain the resources of both information technology departments and even automated solutions employed by enterprises for managing network connected devices.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

Figure 1:
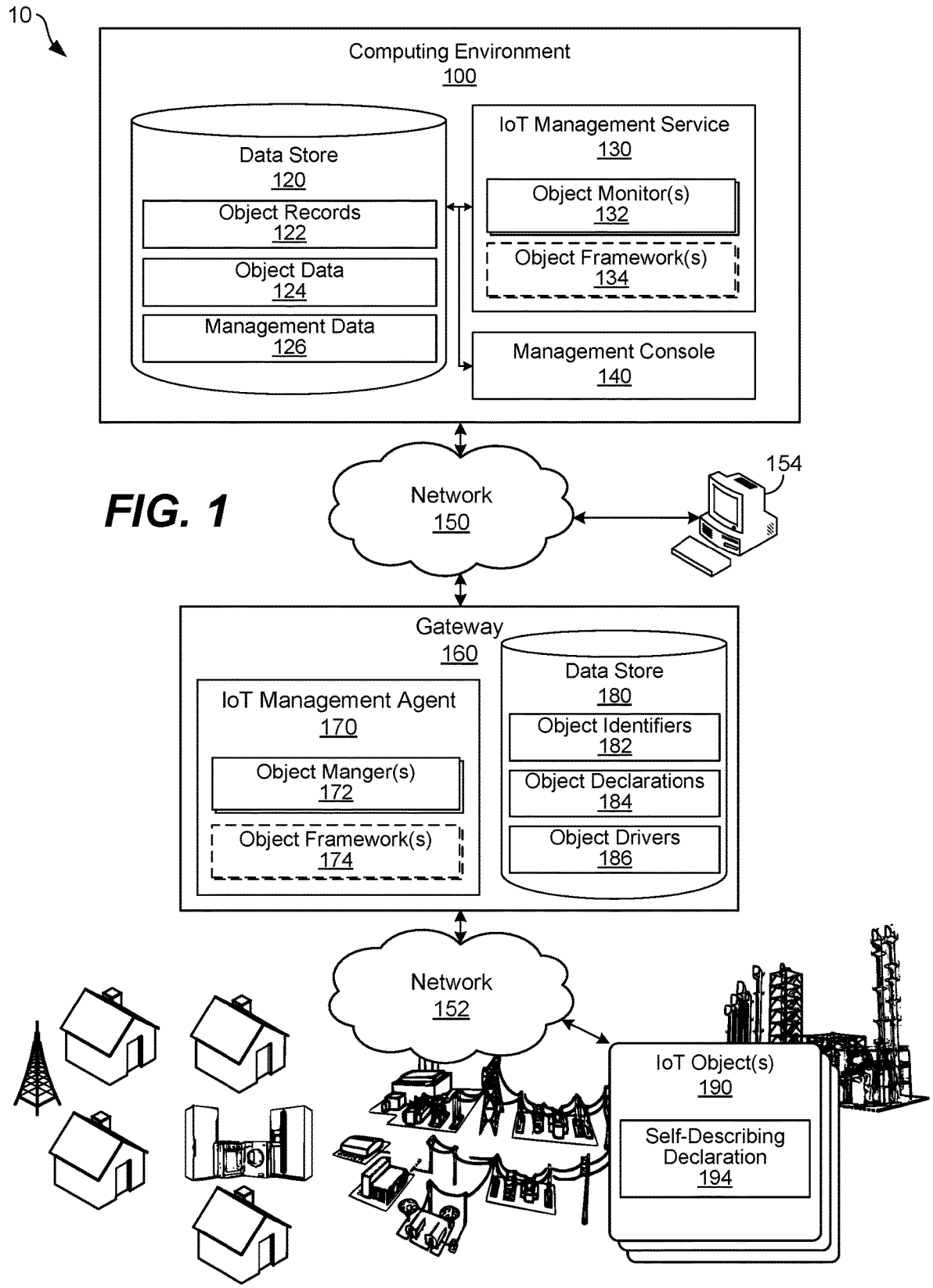
FIG. 1 illustrates an example networked environment for object management through self-describing declarations according to various examples described herein.

It can be challenging to implement and manage large numbers of internet of things (IoT) objects or devices. Large-scale IoT implementations can result in the need to provision and onboard the IoT objects, gather, aggregate, and analyze data from the IoT objects, deploy software updates and security patches to the IoT objects, and update configurations and settings on the IoT objects over time. To the extent possible, IoT management computing environments and management services can be designed to automate the deployment of IoT objects.

Even with automated solutions, however, IoT management environments and services need to be customized to establish new communications and alerting frameworks for interfacing with new IoT devices. In other words, when new IoT objects, including various types of sensors, are powered on and registered with IoT management environments and services, the management services often lack the context necessary to receive and process the data from the IoT objects in a meaningful way. With the extensive variety of IoT objects currently available for different purposes, and with the expected addition of new IoT objects for various purposes in the future, significant resources will continue to be focused on the development of communications and alerting frameworks between IoT objects and IoT management environments and services.

As large numbers of different IoT objects are installed and powered on in the field, IoT management environments and services can receive requests to provision and register the IoT objects for management. The IoT management services might lack the context or awareness to know what types of IoT objects are requesting registration. The IoT management services might also lack any reason to know the surrounding context of any data received from the IoT objects, the frequency at which that data will be received, and the metrics by which that data should be evaluated. For data received from a temperature-sensing IoT object, for example, the IoT management services might lack any context to understand what ranges of temperatures are normal or expected, on one hand, versus what ranges of temperatures are within an anomalous or pathologic range (e.g., indicative of an problem or unhealthy system state), on the other hand. In other words, the measure of temperature might be application-specific, such as the temperature of a pump, a processor, a motor, or other reading. Other measurements for consideration include battery level, processor load, level of vibration, and others. The differences between normal and pathological readings or measurements is dependent, in each case, on the particular application. The IoT management services might also lack any context to know what temperatures should invoke the notification of an alert or alarm condition. In many cases, developers must manually develop specific software to establish the communications and alerting frameworks for IoT object management.

The ongoing need to develop communications and alerting software bridging the IoT objects to the IoT management services generally impedes the ability to quickly roll out large-scale IoT implementations, is costly, and does not easily scale. Additionally, the administrators of the IoT management services are not in the best position to know the surrounding context with which to evaluate the data received from IoT objects. Instead, the manufacturers of the IoT objects and the individuals employed to install and configure those IoT objects in the field are in a better position to know how the data from IoT objects should be evaluated.

A new approach to the management of IoT objects through self-describing declarations is described herein. The benefits described herein are achieved, in part, through the use of self-describing declarations stored on IoT objects. The self-describing declarations can include a schema that defines certain operating and interface parameters for the IoT object. The operating and interface parameters can be referenced by IoT management services to automate the establishment of communications and alerting frameworks for new IoT object deployments.

According to the new approach, an IoT object can be registered with an IoT device management system to onboard and provision the IoT device for oversight and lifecycle management. During or after the onboarding process, the IoT device management system can query the IoT object for a self-describing declaration. The self-describing declaration can be organized in a schema, such as a markup language schema, identify the IoT object, and define various operability parameters for the IoT object. The IoT device management system can then parse the self-describing declaration to determine the operability parameters for the IoT object.

Among other information, the operability parameters can include both operating parameters and interface parameters for the IoT object. The operating parameters can define, for example, normal and abnormal data ranges for infrastructure parameters, thresholds for alerting conditions, and other context for the evaluation of data received from the IoT device. The interface parameters can define function call parameters, to establish an interoperability framework between the IoT device management system and the IoT object. The interoperability framework can define, in part, the format and timing for which the IoT object and the IoT device management system will communicate with each other. The interoperability framework can also establish or define what data processing and alerting processes are executed, respectively, by the IoT object and the IoT device management system. Based on self-describing declarations from various IoT objects, a number of different IoT objects can be easily recognized, provisioned, and managed by IoT device management systems without a priori knowledge.

Turning to the drawings, the following paragraphs provide an outline of a networked environment followed by a discussion of the operation of the same. FIG. 1 illustrates an example networked environment for object management through self-describing declarations according to various examples described herein. The networked environment 10 is provided as a representative example for purposes of discussion, but alternative network structures can be relied upon. The networked environment 10 can include other networked components not illustrated in FIG. 1. The networked environment 10 can also omit certain components shown in FIG. 1, such as the gateway 160 in some implementations. The networked environment 10 is structured in a three-tier architecture and includes a computing environment 100, networks 150 and 152, a client device 154, a gateway 160, and a number of IoT objects 190. The networks 150 and 152 communicatively couple the computing environment 100, the client device 154, the gateway 160, and the IoT objects 190 together for data communications among them.

The computing environment 100 can be embodied as one or more computers, computing devices, or computing systems. In certain embodiments, the computing environment 100 can include one or more computing devices arranged, for example, in one or more server or computer banks. The computing device or devices can be located at a single installation site or distributed among different geographical locations. The computing environment 100 can include a plurality of computing devices that together embody a hosted computing resource, a grid computing resource, or other distributed computing arrangement, managed as a software-defined data center (SDDC). Thus, the computing environment 100 can be embodied as an elastic computing resource where an allotted capacity of processing, network, storage, or other computing-related resources varies over time. As further described below, the computing environment 100 can also be embodied, in part, as certain functional or logical (e.g., computer-readable instruction) elements or modules as described herein.

The computing environment 100 can operate as an IoT management service or system, along with the gateway 160, for the IoT objects 190, among other devices. In that context, the computing environment 100 includes a data store 120, an IoT management service 130, and a management console 140. The management service 130 includes one or more object monitors 132 and one or more object frameworks 134, among other components. The IoT management service 130 and the management console 140 can be embodied as applications executing on the computing environment 100. In some cases, the IoT management service 130 can be hosted on a computing device or computing system distributed apart from the management console 140. The operations of the IoT management service 130 and the management console 140 are described in further detail below. One primary task for the IoT management service 130, as described herein, is to manage the operations of the gateway 160 and the IoT objects 190, as software-defined, self-describing devices managed by the IoT management service 130 based on the object frameworks 134.

The data store 120 can be embodied as a medium to store data and includes memory areas for the storage of object records 122, object data 124, and management data 126, among other types of data. The data store 120 can store data in the form of relational databases, object-oriented databases, hierarchical databases, hash tables or similar key-value data stores, as well as other data structures. The object records 122, object data 124, and management data 126 are associated with the functional components and operations of the computing environment 100, as described below.

The object records 122 can include a number of individual records related to respective IoT objects 190. The records can be created, deleted, updated, and modified at the direction of the object monitors 132, over time, as respective IoT objects 190 are provisioned and enrolled for management by the IoT management service 130. Each record in the object records 122 can include a device identifier for an IoT object 190, one or more device properties or characteristics associated with the IoT object 190, and other data related to the IoT object 190. Examples of device identifiers for IoT objects 190 include media access control (MAC) addresses of network interfaces of individual IoT objects 190, globally unique identifiers (GUIDs) or universally unique identifiers (UUIDs) assigned to individual IoT objects 190, international mobile equipment identifier (IMEI) numbers assigned to cellular modems of IoT objects 190, and tuples that uniquely identify an IoT object 190, such as a combination of a manufacturer name and serial number. Examples of device properties can include the manufacturer, object type name, object model number, object version number, and software version of the IoT objects 190. Examples of the device characteristics can include data that reflects the status of IoT objects 190 or certain components of the IoT objects 190.

The object data 124 can include data related to individual IoT objects 190, such as data received from the IoT objects 190 over time. Data can be relayed from the IoT objects 190 to the computing environment 100 by the gateway 160 or another related intermediary component in the networked environment 10. As described below, the IoT objects 190 can include a variety of different sensors and processing circuitry, and the data received from individual ones of the IoT objects 190 can vary as compared to each other. Additionally, a number of different types of data can be received from each of the IoT objects 190, such as sensor data, battery level data, heartbeat data, timing data, memory and processor utilization data, and other data. Thus, the object data 124 can include a wide range of different types of data. The object data 124 can be aggregated, processed, and analyzed by the object monitors 132 over time. In that sense, the object monitors 132 can include various services for data processing, analytics, and artificial intelligence (AI) processing on the object data 124.

The management data 126 includes data relied upon by the IoT management service 130 to manage and administer the IoT objects 190 as software-defined, self-describing devices. Among other data, the management data 126 can include aggregated and statistical metrics related to the operating characteristics of the IoT objects 190, for presentation through the management console 140. The management data 126 can also include data related to the operating status of one or more of the IoT objects 190, individually or in aggregated form, including operating conditions for which remediation or notifications are warranted. The management data 126 can also include data related to what and when actions should be taken in various circumstances, such as when software updates should be deployed to the IoT objects 190, what thresholds should trigger notifications and alerts related to the IoT objects 190, and other user-defined parameters for the management and administration of the IoT objects 190 as software-defined, self-describing devices.

The IoT management service 130 ("management service 130") can be configured to oversee the operation of the IoT gateway 160 and the IoT objects 190. Among other processes, the management service 130 can be configured to track and manage the IoT objects 190, monitor the infrastructure and health of the gateway 160 and the IoT objects 190, orchestrate and track the receipt of data from the gateway 160 and the IoT objects 190, perform operational analytics on the data received from the gateway 160 and the IoT objects 190, and orchestrate software and security updates for the IoT objects 190. Additionally, the management service 130 can be configured to establish an interoperability framework between one or more of the object monitors 132, the gateway 160, and one or more of the IoT objects 190 based on the self-describing declarations of the IoT objects 190 as described below.

Many of the IoT objects 190 can generate a continuous stream of data that is communicated to the gateway 160, the computing environment 100, or both the gateway 160 and the computing environment 100 over time. The object monitors 132 can monitor and process the data received from individual ones of the IoT objects 190 for the purposes described herein, among others. The object monitors 132 can, individually, be instantiated by the management service 130 and executed to process data from a respective one (or a group) of the IoT objects 190. Additionally or alternatively to the object monitors 132, the management service 130 can start one or more process threads or related components to process data from the IoT objects 190.

Among other operations, the object monitors 132 can track operational data received from the IoT objects 190, such as processor utilization, memory availability, battery life, and other operational data, and correlate it with historic data, as well as information from other devices, to identify anomalies in the data. To that end, the object monitors 132 can analyze and compare data received from the IoT objects 190 against certain thresholds, trigger automated notifications and remediation actions based on rule-based alerts and API-based integrations with third party systems. The object monitors 132 can incorporate AI, in some cases, to help determine when the data received from the IoT objects 190 is within one or more acceptable or normal ranges, on one hand, versus within one or more anomalous or pathologic ranges (e.g., indicative of an problem or unhealthy system state), on the other hand. The AI can adapt to track variations or trends in what are considered acceptable or normal ranges versus anomalous or pathologic ranges over time. Thus, the object monitors 132 and the management service 130 can provide real-time monitoring and alerts to track the operating status and health of the IoT objects 190. The object monitors 132 can also track the lifecycle of the software executing on the IoT objects 190, particularly in view of potential security concerns, and orchestrate the deployment of security patches, firmware updates, and other updates for the IoT objects 190. The self-describing managed object could include description and hooks for software/firmware updates administered to the device fronted by the device driver.

The manufacturers of the IoT objects 190 can also program or otherwise design the IoT objects 190 to locally process the data captured by local sensors of the IoT objects 190, to determine whether or not the data is within normal or anomalous ranges. The IoT objects 190 can incorporate AI to track variations or trends in what are considered normal versus anomalous ranges of data over time, similar to the AI incorporated in the object monitors 132. Thus, one or more of the IoT objects 190 can conduct data processing locally, on processing circuitry of the IoT objects 190, and communicate with the gateway 160, the IoT management service 130, or both, using callback functions in certain instances. As one example, the IoT objects 190 can identify when a temperature, vibration, or other measurement is outside a normal or expected range and execute a callback function to the gateway 160 upon the identification. This scenario pushes some of the processing requirements of the networked environment 10 back to the IoT objects 190, reducing the processing overhead performed by the gateway 160 and the computing environment 100. Any of the IoT objects 190 can use device specific, unique techniques to determine normal and abnormal conditions and use callback functions, as necessary, to notify the gateway 160, the IoT management service 130, or both of various conditions.

The object frameworks 134 include data evaluation and interoperability frameworks established between the management system 130 and the IoT objects 190, so that the management system 130 can manage and interface with the IoT objects 190 as software-defined, self-describing devices. The development of the object frameworks 134 can be automated by the management system 130 based on the self-describing declarations provided from the IoT objects 190, as described in further detail below. The data evaluation frameworks can define when and how data is aggregated, processed, reviewed for anomalies or pathologic conditions, what alerting thresholds should be applied to the data, and on what conditions events and notifications should be triggered. The data evaluation frameworks can also describe or define the roles and responsibilities for data processing tasks among the management service 130, the gateway 160, and the IoT objects 190, and those roles can vary based on the self-describing declarations provided from the IoT objects 190. Because the evaluation frameworks are based on the self-describing declarations received from the IoT objects

190 at step 312, the manner in which data is processed in the networked environment 10 is determined in large part by the IoT objects 190 themselves. The interoperability frameworks can define the conditions, timing, syntax, and parameters for synchronous function calls, asynchronous function calls, callback functions, and other programming interfaces and function calls for data transfer between the management system 130 and the IoT objects 190.

Each object framework 134 is established based, at least in part, on a self-describing declaration provided from one of the IoT objects 190, according to a schema in the self-describing declaration. Thus, a number of the object frameworks 134 can vary as compared to each other, depending primarily upon the design and purpose of the IoT objects 190. In some cases, the object monitors 132 can evaluate data received from the IoT objects 190 according to certain metrics and frameworks defined in the object frameworks 134. The object frameworks 134 in the managing service 130 are similar to the object frameworks 174 in the gateway 160, and the object frameworks 134 can be omitted from the managing service 130 in certain cases where the gateway 160 handles the interoperability requirements with the IoT objects 190.

Because the object frameworks 134 are established by the managing service 130 based on the self-describing declarations provided from the IoT objects 190, it is not necessary to manually develop interoperability frameworks for the IoT objects 190 as those devices are provisioned for management as software-defined, self-describing devices. Instead, the IoT objects 190 store the self-describing declarations, and the gateway 160 and managing service 130 can receive and parse the self-describing declarations to establish the object frameworks 134 in an automated fashion, reducing the need for custom development of interoperability frameworks. The purpose and use of the self-describing declarations of the IoT objects 190 are described in further detail below.

The management console 140 can be configured to provide an administrative interface for configuring the operation of individual components in the network environment 10. For example, the management console 140 can provide an administrative interface for the management service 130. The management console 140 can also provide an interface for the configuration of the IoT objects 190. An individual, such as an administrator, can access the administrative interface through a client device, for example. The management console 140 can provide the interface in any suitable way, such as through the generation of network pages for access on a network browser of a client device, through updates to a dedicated application executing on the client device, or another interface.

The network 150 can include the Internet, intranets, extranets, wide area networks (WANs), local area networks (LANs), wired networks, wireless networks, cable networks, satellite networks, other suitable networks, or any combinations thereof. As one example, the computing environment 100 can be coupled to one or more public or private LANs or WANs and, in turn, to the Internet for communication of data with the gateway 160. Wired WAN or LAN networks can include Ethernet networks, cable networks, fiber optic networks, and telephone networks such as dial-up, digital subscriber line (DSL), and integrated services digital network (ISDN) networks. Wireless WAN or LAN networks can include cellular networks, satellite networks, Institute of Electrical and Electronic Engineers (IEEE) 802.11 wireless WI-FT® networks, BLUETOOTH® networks, microwave transmission networks, as well as other networks relying on radio broadcasts. Although not shown in FIG. 1, the network 150 can also include network connections to any number and type of network hosts or devices, such as website servers, file servers, cloud computing resources, databases, data stores, or any other network or computing architectures.

The network 152 can be similar in form and structure to the network 150. In some cases, the network 152 can be representative of a LAN that connects computing devices within a building, such as a residence, office, school, laboratory, or similar building, within a collection of buildings, such as buildings in a campus, an office or industrial park, or similar locale, within a vehicle, such as an automobile, an airplane, train, a boat or ship, or other vehicle, or within another environment. Although not shown in FIG. 1, the network 152 can also include network connections to any number and type of network hosts or devices, such as website servers, file servers, cloud computing resources, databases, data stores, or any other network or computing architectures.

In the networked environment 10, the computing environment 100, the client device 154, the gateway 160, and the IoT objects 190 can communicate data among each other using one or more network transfer protocols or interconnect frameworks, such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), other protocols and interconnect frameworks, and combinations thereof.

As discussed in further detail below, the IoT objects 190 can, in some cases, include physical layer communications hardware for data communications with the gateway 160 but might not be IP-capable. Instead, data can be communicated between the IoT objects 190 and the gateway 160 over the network 152 using WI-FI®, BLUETOOTH®, Z-WAVE®, ZigBee, or another mesh or ad-hoc network without using internet protocols, and the gateway 160 can communicate with the computing environment 100 over the network 150 using internet protocols.

The client device 154 is representative of one or more client devices. The client device 154 can be embodied as any computing device, processing circuit, or processor based device or system, including those in the form of a desktop computer, a laptop computer, a tablet computer, a personal digital assistant, a cellular telephone, a wearable computing device, or a set-top box, among other example computing devices and systems. The client device 154 can execute various applications, including hypertext-based network browsers, such as the Internet Explorer®, Firefox®, Chrome®, Safari®, or Silk® browsers, among other types of browsers. The client device 154 can also execute other types of applications, such as an e-mail clients, messaging clients, document editors or viewers, file browsers, or other applications or application extensions for other purposes. An individual, such as an administrator, can interface with the IoT management services provided by the IoT management service 130 by accessing the interfaces generated by the management console 140 as described herein.

The gateway 160 includes an IoT management agent 170 ("management agent 170") and a data store 180. The gateway 160 can act as an edge computing device, operating in part as a proxy or relay between the IoT objects 190 and the IoT management service 130. Thus, the gateway 160 can represent a network access point or interface between the network 152 and the network 150. As one example, the gateway 160 can receive data over the network 152 using the networking standards and communications protocols relied upon by the IoT objects 190, store, process, filter, and encrypt the data, and communicate the data to the computing environment 100 over the network 150 for further processing. In various implementations, the gateway 160 can relay all or only a portion of the data received from the IoT objects 190 back to the computing environment 100. The gateway 160 can also provide a local processing and storage solution, as well as the ability to autonomously control certain operating aspects of the IoT objects 190 based on data from the IoT objects 190.

As described in further detail below, the gateway 160 can host any number of device drivers for the IoT objects. A particular device driver can support a self-describing interface towards the management service 130 and a device specific interface and protocol towards one of the IoT objects 190, and bridges between the two in software, effectively providing a software defined device. The gateway 160 can implement many aspects of the self-describing interface described herein, such as, analyzing vibration signals, sound signals, or other measurements from the IoT objects 170 and determining if those measurements are normal or not.

The management agent 170 can perform various tasks on behalf of the IoT objects 190. In doing so, the management agent 170 can work at the direction of or in concert with the management service 130. For example, the management agent 170 can work as an intermediary agent to register the IoT objects 190 with the management service 130. The management agent 170 includes an object manager 172 and one or more object frameworks 174. The object manager 172 can perform processes similar to the object monitors 132 of the management service 130. For example, the object manager 172 can monitor and process the data received from individual ones of the IoT objects 190. The object manager 172 can track operational data from the IoT objects 190, such as processor utilization, memory availability, battery life, and other operational data, and correlate it with historic data, as well as information from other devices, to identify anomalies in the data. To that end, the object manager 172 can analyze and compare data received from the IoT objects 190 against certain thresholds and trigger automated notifications to the management service 130. Thus, the object manager 172 can provide real-time monitoring and alerting feedback to the management service 130, to track the operating status and health of the IoT objects 190. The object manager 172 can also orchestrate the deployment of security patches, firmware updates, and other updates for the IoT objects 190 at the direction of the management service 130.

The object frameworks 174 of the management agent 170 are similar to the object frameworks 134 of the management service 130. Particularly, the object frameworks 174 include interoperability frameworks established between the management agent 170 and the IoT objects 190. The object frameworks 174 can be established by the management agent 170 based on the self-describing declarations provided from the IoT objects 190. The object frameworks 174 can define the conditions, timing, syntax, and parameters for synchronous function calls, asynchronous function calls, callback functions, and other programming interfaces and function calls for data transfer between the management agent 170 and the IoT objects 190. The object frameworks 174 can also describe or define the roles and responsibilities for data processing tasks among the management service 130, the gateway 160, and the IoT objects 190, and those roles can vary based on the self-describing declarations provided from the IoT objects 190.

The data store 180 includes memory areas to store object identifiers 182, object declarations 184, and object drivers 186, among other data. The object identifiers 182 can include MAC addresses of individual IoT objects 190, GUIDs or UUIDs assigned to individual IoT objects 190, IMEI numbers assigned to cellular modems of IoT objects 190, tuples that uniquely identify individual IoT objects 190, such as a combination of a manufacturer name and serial number, and other suitable identifiers. The object declarations 184 can include copies of the self-describing declarations obtained from the IoT objects 190, which are used by the gateway 160 to establish the object frameworks 174. The object declarations 184 can include data related to individual IoT objects 190, such as data received from the IoT objects 190 over time. Any of the data stored in the object identifiers 182 and the object declarations 184 can be communicated to the computing environment 100 and stored as part of one or more of the object records 122.

The object drivers 186 can include individual drivers for one or more of the IoT objects 190. The object drivers 186 can be defined, in part, based on the self-describing declarations obtained from the IoT objects 190. The gateway 160 is configured to host one or more of the device drivers for the IoT objects 190, to extend the functionality of the IoT objects 190 through the IP-based network 150 back to the IoT management service 130 and the management console 140, effectively making the IoT objects 190 software-defined self-describing devices.

The IoT objects 190 can be embodied as network-connected embedded devices. The IoT objects 190 can include embedded processing and memory circuitry. The IoT objects 190 can be incorporated into home appliances, such as locks, refrigerators, thermostats, sprinkler controllers, smoke detectors, garage door openers, light-switches, fans, lights, security cameras, or similar devices. The IoT objects 190 can be incorporated into vehicles, as part of on-board diagnostic sensors, access controls, remote monitoring and notification controls, or for other purposes. The IoT objects 190 can be relied upon as industrial or commercial sensors, such as supervisory control and data acquisition sensors.

The IoT objects 190 can include one or more sensors or specific-purpose circuitry to monitor and control the operating state of various types of equipment, machinery, tools, appliances, security systems, cameras, thermostats, and other devices. Example sensors include contact sensors, optical sensors, temperature sensors, proximity sensors, pressure sensors, humidity sensors, water quality sensors, acoustic sensors, chemical and gas sensors, smoke sensors, infrared sensors, level sensors, image sensors, motion sensors, accelerometer sensors, and gyroscope sensors, among others. Each of the IoT objects 190 can incorporate one or a combination of any of the above-identified sensors, among others, and gather data using the sensors.

The IoT objects 190 can be relatively simple, low cost devices, suitable for large-scale implementations. The IoT objects 190 might lack general purpose processors, large memory arrays, and operating systems capable of remote management. Thus, the IoT objects 190 might lack the ability to execute a management agent similar to the management agent 170 on the gateway 160. Similarly, the IoT objects 190 can rely upon relatively simple physical layer communications hardware for data communications with the gateway 160, without being IP-capable. Instead, data can be communicated between the IoT objects 190 and the gateway 160 using WI-FI®, BLUETOOTH®, Z-WAVE®, ZigBee, or another mesh or ad-hoc network, and the gateway 160 can relay data from the IoT objects 190 to the computing environment 100.

The IoT objects 190 can store data and, in some cases, process the data, analyze the data, and trigger the report of notifications or alert conditions under certain circumstances. With the wide variety of IoT objects 190 that are commercially available, however, the types and capabilities of each of the IoT objects 190 can vary significantly as compared to each other. Similarly, the IoT objects 190 can be designed to communicate data, notifications, and other information at different times and intervals, using different protocols and syntaxes, and for different reasons and circumstances. Thus, if the networked environment 10 incorporates a number of different IoT objects 190, the gateway 160 and the computing environment 100 must establish a number of different interoperability frameworks to interface with the IoT objects 190.

As shown in FIG. 1, the IoT objects 190 store at least one self-describing declaration 194 to facilitate the establishment of the interoperability frameworks described herein, including the object frameworks 134 and the object frameworks 174. As described in further detail below, each self-describing declaration 194 can include a schema that defines certain operating and interface parameters for an IoT object 190. The operating and interface parameters can be referenced by the management agent 170 of the gateway 160, the management service 130 of the computing environment, or both, to determine certain operating characteristics and operability parameters of the IoT objects 190 and automate the establishment of interoperability frameworks for the IoT objects 190.

Figure 2:
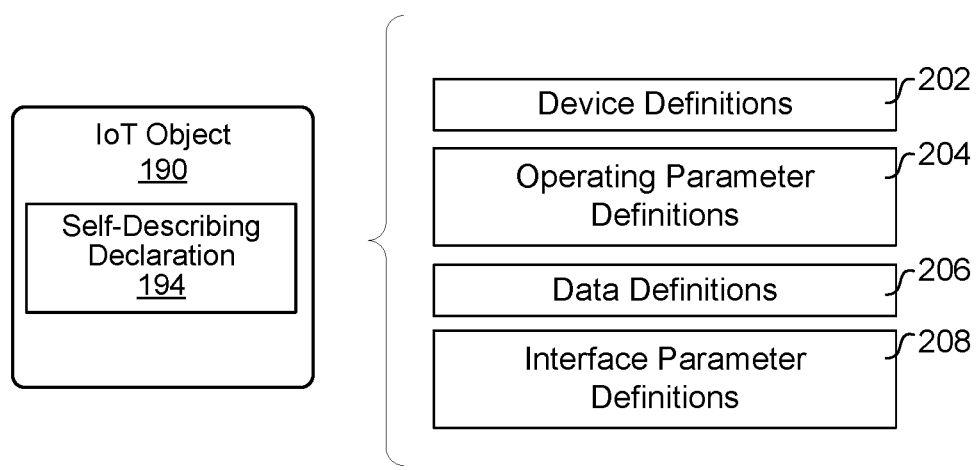
FIG. 2 illustrates a representative example of the content of a self-describing declaration according to various examples described herein.

FIG. 2 illustrates a representative example of the content of a self-describing declaration 194 according to various examples described herein. FIG. 2 is provided as an example, and self-describing declarations can include additional information not illustrated in FIG. 2. As described in further detail below with reference to FIGS. 3A and 3B, As shown, the self-describing declaration 194 can include device definitions 202, operating parameter definitions 204, data definitions 206, and interface parameter definitions 208 for an IoT object 190, among other definitions and information. The device definitions 202 can define variable names, types, and data related to the type of the IoT object 190, the manufacturer of the IoT object 190, the software or hardware version or revision number of the IoT object 190, the purpose of the IoT object 190, and other definitions.

The operating parameter definitions 204 can define a schema of certain operating parameters related to the IoT object 190 and data captured by the IoT object 190. The operating parameter definitions 204 can define memory and processor usage definitions and data, power and battery level definitions and data, and other operational characteristics and related data. The operating parameter definitions 204 also define certain operating ranges or conditions, such as normal or expected and anomalous or pathologic operating conditions, of the IoT object 190.

The data definitions 206 can define data variable names, data types, and data related to sensor data captured by the IoT object 190. The data definitions 206 can also define certain data ranges, such as normal or expected and anomalous or pathologic ranges of data, for the IoT object 190. The data definitions 206 can also define alert and notification thresholds for data from the IoT object 190, among other thresholds.

The interface parameter definitions 208 can define a schema for an interface framework with the IoT object 190. For example, the interface parameter definitions 208 can define interface parameters and handles for synchronous function calls, asynchronous function calls, callback functions, and other programming interfaces and function calls for communications and event handling between the IoT object 190, the gateway 160, and the computing environment 100. The interface parameter definitions 208 can be relied upon by the gateway 160 and the computing environment 100 to define the respective roles of the components in the networked environment 10, including the IoT objects 190, for communications and event handling among them.

Figure 3A:
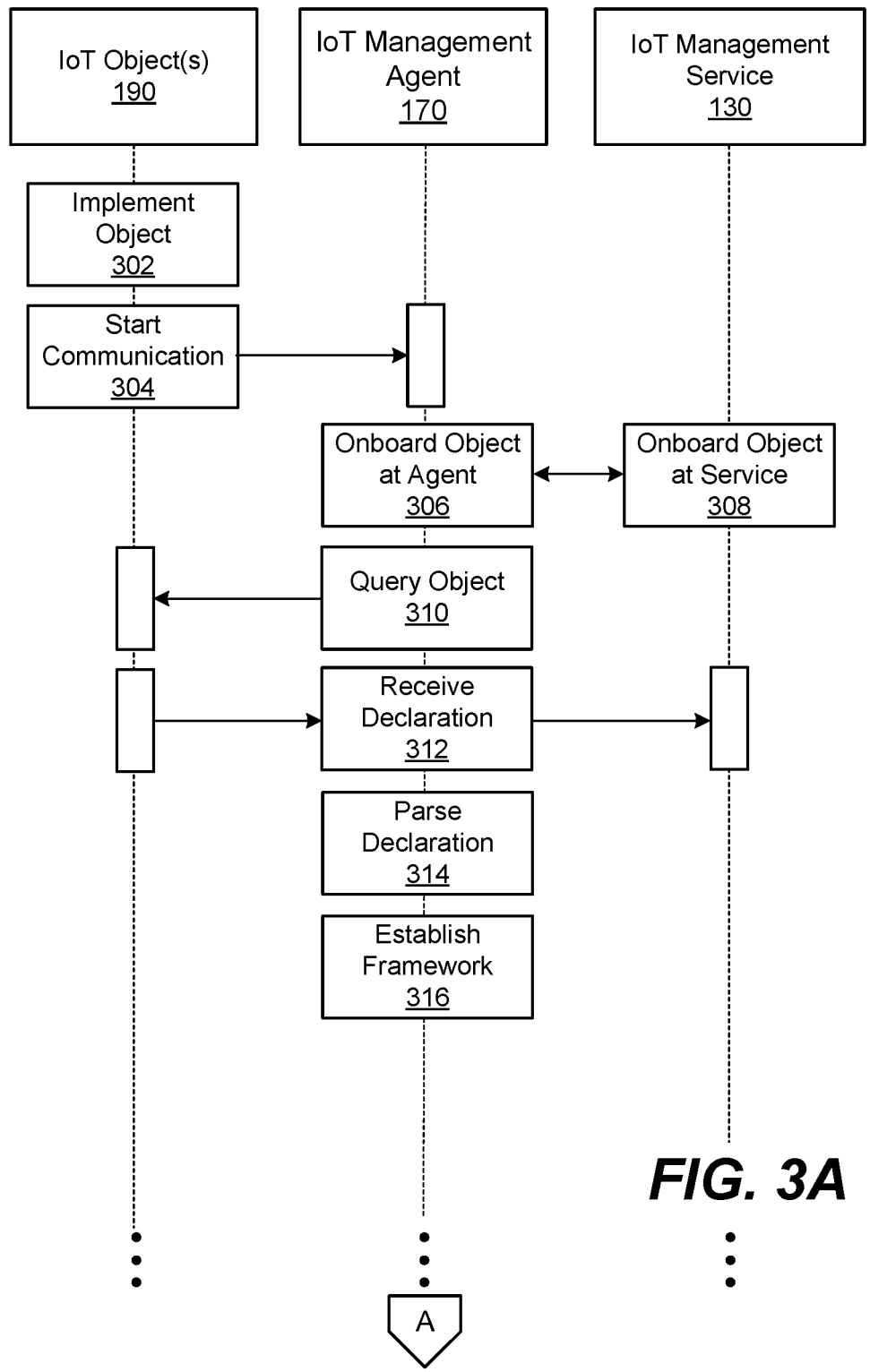
FIG. 3A illustrates a process for object management through self-describing declarations according to various examples described herein.
Figure 3B:
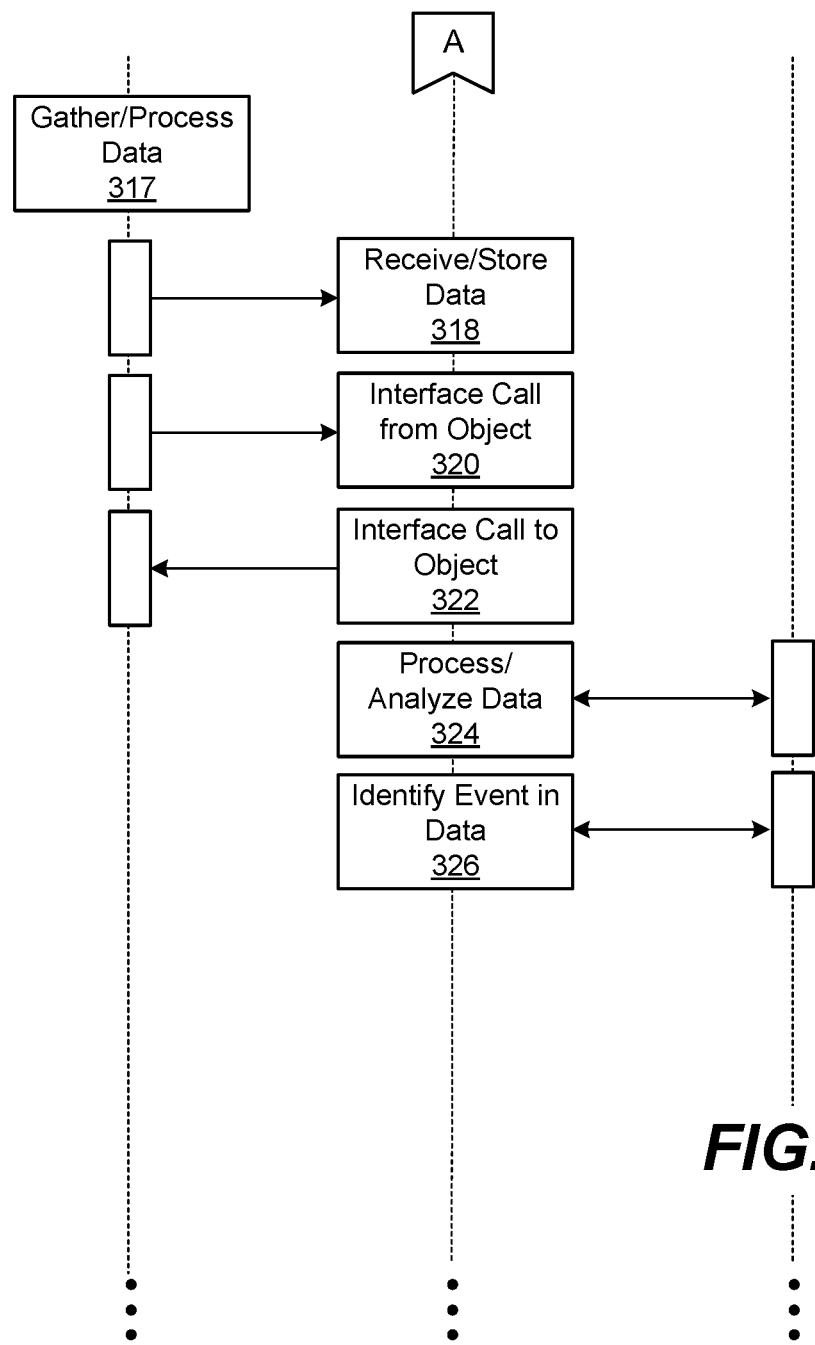
FIG. 3B further illustrates the process for object management through self-describing declarations shown in FIG. 3A according to various examples described herein.

Turning to a description of the operations of the components described in FIG. 1, FIGS. 3A-3B illustrate a process for object management through self-describing declarations according to various examples described herein. The process is described in connection with the components described and illustrated in FIG. 1, although other components in similar environments can perform the process. Although the process diagrams show an order of operation or execution, the order can differ from that which is shown. For example, the order of execution of two or more process steps can be switched relative to the order shown or as described below. Also, two or more process steps shown in succession can be executed concurrently or with partial concurrence. Further, in some examples, one or more of the process steps shown in the process diagrams can be skipped or omitted.

At step 302, the process can include implementing one or more of the IoT objects 190. Depending upon the implementation, field technicians can install and configure the IoT objects 190, power the IoT objects 190 on, and confirm the IoT objects 190 are functioning. The implementing at step 302 can occur over time and in various ways depending upon the type of the IoT objects 190, the purpose of the IoT objects 190, and the manner in which the IoT objects 190 are distributed and powered on in the field.

At step 304, the process can include one or more of the IoT objects 190 starting communications. The IoT objects 190 can communicate over the network 152 with the gateway 160 at step 304, using wired or wireless communications protocols. The communications at step 304 can include a request to provision and register the IoT objects 190 for management. In that context, the communications from the IoT objects 190 at step 304 can include certain information, such as unique identifiers from the IoT objects 190, to assist with provisioning. The gateway 160 can identify the communications from the IoT objects 190 and begin an onboarding process to enroll the IoT objects 190 for management.

At step 306, the process can include the management agent 170 at the gateway 160 onboarding one or more of the IoT objects 190. The management agent 170 can open records and store data for the IoT objects 190 in the data store 180, start one or more of the object managers 172 for management of the IoT objects 190, and communicate with the management service 130 on the computing environment 100 to provision the IoT objects 190 for management.

At step 308, the process can include the management service 130 at the computing environment 100 onboarding one or more of the IoT objects 190. The management service 130 can open records and store data for the IoT objects 190 in the data store 120, start one or more of the object monitors 132 for management of the IoT objects 190, and communicate with the management agent 170 on the gateway 160 to provision the IoT objects 190 for management.

After (or as part of) the initial onboarding and provisioning, the process can include querying one or more of the IoT objects 190 for a self-describing declaration at step 310. Here, the gateway 160 can request the self-describing declarations from the IoT objects 190, to gather certain operability parameters related to the IoT objects 190. As noted above, when the IoT objects 190 are first provisioned and registered at steps 306 and 308, the management service 130 and the management agent 170 might lack the context necessary to receive and process the data from the IoT objects 190 in a meaningful way. Thus, the step of querying at step 310 amounts to a request for further information from the IoT objects 190.

At step 312, the process can include the gateway 160 receiving one or more of the self-describing declarations 194 from one or more of the IoT objects 190. The self-describing declarations can be formatted in any suitable manner and include the definitions, operating parameters, interface parameters, and other data contained within the self-describing declarations 194. In some cases, the process can also include the computing environment 100 receiving copies of the self-describing declarations 194 from one or more of the IoT objects 190 at step 312, either directly or relayed through the gateway 160.

At step 314, the process can include the management agent 170 parsing the self-describing declarations 194 received at step 312. The management agent 170 can review the contents of the self-describing declarations 194 and identify the device definitions 202, operating parameter definitions 204, data definitions 206, and interface parameter definitions 208 contained within the self-describing declarations 194. Here, the management agent 170 can determine, for example, the manner and timing in which the IoT objects 190 will format and communicate data to the gateway 160. The management agent 170 can also determine the expected ranges of the data, alert thresholds for analyzing and evaluating the data, event and notification conditions, and other parameters related to processing the data received from the IoT objects 190. In some cases, the process can also include the management service 130 at the computing environment 100 parsing the self-describing declarations 194.

At step 316, the process can include the management agent 170 establishing one or more of the object frameworks 174 between the management agent 170 and the IoT objects 190. In some cases, the process can also include the management service 130 establishing the object frameworks 134. The object frameworks 174 can include data evaluation frameworks and interoperability frameworks based on the self-describing declarations 194 received at step 312. The data evaluation frameworks can define the manner in which the object managers 172 will process and analyze data received from the IoT objects 190, and can be referenced for the data processing at step 320. For example, the data evaluation frameworks can define when and how data is aggregated, processed, reviewed for anomalies or pathologic conditions, what alerting thresholds should be applied to the data, and on what conditions events and notifications should be triggered. Because the evaluation frameworks are based on the self-describing declarations received from the IoT objects 190 at step 312, the manner in which data is processed by the gateway 160 is determined in large part by the IoT objects 190 themselves.

The interoperability frameworks established at step 316 can define the manner in which data communications and event handling will occur between the management agent 170 and the IoT objects 190. Thus, at step 316, the management agent 170 can establish interfaces for synchronous function calls, asynchronous function calls, callback functions, and other programming interfaces for data transfer and event handling between the management agent 170 and the IoT objects 190. These function calls can occur at later steps in the process, such as at steps 322 or 324.

Turning to FIG. 3B, the remaining steps can occur in any order, and concurrently, over time, but should in any case adhere to object frameworks 174 established at step 316. At step 317, the process includes one or more of the IoT objects 190 gathering and, in some cases, processing data captured by local sensors of the IoT objects 190. Various types of data can be gathered by the IoT objects 190 for various purposes at any suitable interval or timing. In some cases, the IoT objects 190 can process the data captured by local sensors of the IoT objects 190, locally, to determine whether or not the data is within normal ranges, within anomalous ranges, and when an alert should be raised. This scenario pushes some of the processing requirements of the networked environment 10 back to the IoT objects 190, reducing the processing overhead performed by the gateway 160 and the computing environment 100.

At step 318, the management agent 170 can receive data from the IoT objects 190 in a periodic, time series manner. In this case, the management agent 170 can expect to receive a stream of data from one or more of the IoT objects 190 over time at step 318. The management agent 170 might expect to receive such a stream of data from any of the IoT objects 190 that perform little or no local processing. In this scenario, data processing can occur in later steps, including at steps 324 and 316, described below.

Additionally or alternatively, at step 320, the process can include the management agent 170 receiving an interface call from one or more of the IoT objects 190. The interface call can be triggered, at the side of one of the IoT objects 190, based on a certain event at the IoT object 190, such as an alert condition. For example, one of the IoT objects 190 can identify when a temperature, vibration, or other measurement is outside a normal or expected range and execute a callback function to the gateway 160 at step 320 upon the identification to raise an alert. This scenario pushes some of the processing requirements of the networked environment 10 back to the IoT objects 190, possibly reducing or eliminating the processing requirements at step 324, at step 326, or both.

The interface call at step 320 can be a synchronous function call, an asynchronous function call, or a callback function call, but should in any case adhere to object frameworks 174 established at step 316. The interface call at step 320 can be accompanied by the transfer of data, such as data related to certain anomalous or pathologic conditions, such as high temperatures, high pressures, or other condition identified by the one of the IoT objects 190. The data can also be related to certain operating characteristics of the IoT objects 190 themselves, such as low battery conditions, high memory or processor usage conditions, or data that indicates a hardware or software failure condition. However, other events or conditions can trigger the interface call at step 320.

Further, at step 322, the process can include the management agent 170 sending an interface call to one or more of the IoT objects 190. The interface call can be triggered, at the management agent 170, based on a certain events or timings determined at the management agent 170. The interface call at step 322 can be any type of function call, but should in any case adhere to object frameworks 174 established at step 316. The interface call at step 322 can also be accompanied by the transfer of data or the request for data, including data to direct the operation of one or more of the IoT objects 190.

Thus, at steps 318, 320, and 322, data communications can occur between the IoT objects 190 and the management agent 170 of the gateway 160 periodically over time, based on one or more function calls from the IoT objects 190 (e.g., at step 320), based on one or more function calls to the IoT objects 190 (e.g., at step 322), or in another suitable manner. In any case, the communications will adhere to the interoperability standards and frameworks defined at step 316.

At step 324, the process can include the management agent 170 processing and analyzing the data received at steps 318, 320, and 324 according to the object frameworks 174. For example, one or more of the object managers 172 can store the data, aggregate the data, process the data from the IoT objects 190, review the data for anomalies or pathologic conditions, and apply alerting thresholds to the data to determine whether or not alert events and notifications should be triggered based on the evaluation frameworks defined in the object frameworks 174. The management agent 170 can also communicate and interface with the management service 130 at step 324 (or in earlier steps), to forward the results of the data processing.

At step 326, the process can include the management agent 170 identifying one or more events based on the data processing at step 324. For example, one or more of the object managers 172 can identify data anomalies or pathologic conditions in the data received from the IoT objects 190. The object managers 172 can apply the alerting thresholds or other evaluation frameworks established at step 316 to identify the conditions for which management actions should be taken. The management agent 170 can also communicate with the management service 130 based on any conditions that should be reported for management of the IoT objects 190. Thus, the object managers 172 of the management agent 170 can provide real-time monitoring and alerting feedback to the management service 130 at step 326, to track the operating status and health of the IoT objects 190.

Overall, the data communications, interface calls, data analysis, and event identification steps shown in FIG. 3B are defined and directed based on the self-describing declarations 194 in the IoT objects 190. Once the self-describing declarations 194 are received at step 312 and parsed at step 314 in FIG. 3A, the frameworks for the steps shown in FIG. 3B can be established at step 316 in FIG. 3A. Thus, the self-describing declarations 194 reduce (or potentially eliminate) any ongoing need to develop communications and alerting frameworks between the IoT objects 190 and the gateway 160, facilitating the ability to quickly roll out large-scale IoT implementations. Finally, while the steps shown in FIG. 3B are described as being performed by the management agent 170 of the gateway 160, the steps can be performed by the management service 130 of the computing environment 100, or by a combination of the management service 130 and the management agent 170.

The flowcharts in FIGS. 3A-3B show examples of the functions and operations of the components described herein. The components described herein can be embodied in hardware, software, or a combination of hardware and software. If embodied in software, each element can represent a module or group of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

The computing environment 100 can include at least one processing circuit. Such a processing circuit can include, for example, one or more processors and one or more storage or memory devices coupled to a local interface. The local interface can include, for example, a data bus with an accompanying address/control bus or any other suitable bus structure. Similarly, the gateway 160 can include at least one processing circuit. Such a processing circuit can include, for example, one or more processors and one or more storage or memory devices coupled to a local interface.

The storage or memory devices can store data or components that are executable by the processors of the processing circuit. For example, the management service 130, the management agent 170, and/or other components can be stored in one or more storage devices and be executable by one or more processors in the computing environment 100 and the gateway 160.

The management service 130, management agent 170, and/or other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Further, any logic or applications described herein, including the management service 130, the management agent 170, and/or other components can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices. Additionally, terms such as "application," "service," "system," "engine," "module," and so on can be used interchangeably and are not intended to be limiting.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

What is claimed is:

1. A method for self-described object management, comprising:
  onboarding an internet of things (IoT) object with an IoT management system;
  querying, by the IoT management system, the IoT object for a self-describing declaration from the IoT object;
  receiving, by the IoT management system, the self-describing declaration from the IoT object;
  parsing the self-describing declaration from the IoT object to determine an interface parameter schema for the IoT object and an operating parameter schema for the IoT object; and
  establishing an interoperability framework between the IoT management system and the IoT object based on the interface parameter schema for the IoT object and the operating parameter schema for the IoT object.

2. The method of claim 1, wherein:
  the self-describing declaration from the IoT object identifies a type of the IoT object; and
  the operating parameter schema for the IoT object defines at least one of a normal operating state of the IoT object and at least one pathologic operating state of the IoT object.

3. The method of claim 2, wherein:
  the operating parameter schema for the IoT object further defines an alert threshold for data values from the IoT object; and
  the method further comprises processing data received from the IoT object to detect an alert event based on the alert threshold.

4. The method of claim 1, wherein:
  the interface parameter schema for the IoT object defines at least one function call parameter of the interoperability framework for the IoT management system.

5. The method of claim 1, wherein the interoperability framework comprises at least one applications programming interface (API) function call between the IoT management system and the IoT object.

6. The method of claim 1, wherein:
  establishing the interoperability framework comprises implementing, by the IoT management system, a callback interface for the IoT object based on the self-describing declaration from the IoT object;
  the IoT object locally processes data captured by at least one sensor of the IoT object to determine an alert condition; and
  the method further comprises receiving a call from the IoT object over the callback interface in response to the alert condition at the IoT object.

7. The method of claim 1, further comprising implementing, by the IoT management system, an evaluation process for processing data values received from the IoT object according to the self-describing declaration, the self-describing declaration defining a threshold for an alert condition of the evaluation process.

8. The method of claim 1, wherein the IoT management system is at least one of an IoT gateway or an IoT computing environment.

9. A non-transitory computer-readable medium embodying program code for self-described object management that, when executed by a computing device, directs the computing device to at least:
  onboard an internet of things (IoT) object with an IoT management system;
  query, by the IoT management system, the IoT object for a self-describing declaration from the IoT object;
  receive, by the IoT management system, the self-describing declaration from the IoT object;
  parse the self-describing declaration from the IoT object to determine an interface parameter schema for the IoT object and an operating parameter schema for of the IoT object; and
  establish an interoperability framework between the IoT management system and the IoT object based on the interface parameter schema for the IoT object and the operating parameter schema for the IoT object.

10. The non-transitory computer-readable medium according to claim 9, wherein:
  the self-describing declaration from the IoT object identifies a type of the IoT object; and
  the operating parameter schema for the IoT object defines at least one of a normal operating state of the IoT object and at least one pathologic operating state of the IoT object.

11. The non-transitory computer-readable medium according to claim 10, wherein:
  the operating parameter schema for the IoT object further defines an alert threshold for data values from the IoT object; and
  the computing device is further directed to process data received from the IoT object to detect an alert event based on the alert threshold.

12. The non-transitory computer-readable medium according to claim 9, wherein:
  the interface parameter schema for the IoT object defines at least one function call parameter of the interoperability framework for the IoT management system.

13. The non-transitory computer-readable medium according to claim 9, wherein the interoperability framework comprises at least one applications programming interface (API) function call between the IoT management system and the IoT object.

14. The non-transitory computer-readable medium according to claim 9, wherein:
  the IoT object locally processes data captured by at least one sensor of the IoT object to determine an alert condition; and
  the computing device is further directed to at least:
    implement, by the IoT management system, a callback interface for the IoT object based on the self-describing declaration from the IoT object; and
    receive a call from the IoT object over the callback interface in response to the alert condition at the IoT object.

15. The non-transitory computer-readable medium according to claim 9, wherein the computing device is further directed to at least:
  implement, by the IoT management system, an evaluation process for processing data values received from the IoT object according to the self-describing declaration, the self-describing declaration defining a threshold for an alert condition of the evaluation process.

16. A computing device for self-described object management, comprising:

a memory device configured to store computer-readable instructions thereon; and at least one processing device configured, through execution of the computer-readable instructions, to direct the computing device to at least:

onboard an internet of things (IoT) object with an IoT management system;

query, by the IoT management system, the IoT object for a self-describing declaration from the IoT object;

receive, by the IoT management system, the self-describing declaration from the IoT object;

parse the self-describing declaration from the IoT object to determine an interface parameter schema for the IoT object and an operating parameter schema for the IoT object; and establish an interoperability framework between the IoT management system and the IoT object based on the interface parameter schema for the IoT object and the operating parameter schema for the IoT object.

17. The computing device according to claim 16, wherein:
the self-describing declaration from the IoT object identifies a type of the IoT object; and
the operating parameter schema for the IoT object defines at least one of a normal operating state of the IoT object or at least one pathologic operating state of the IoT object.

18. The computing device according to claim 17, wherein:
the operating parameter schema for the IoT object further defines an alert threshold for data values from the IoT object; and
the at least one processing device is further directed to process data received from the IoT object to detect an alert event based on the alert threshold.

19. The computing device according to claim 16, wherein:
the interface parameter schema for the IoT object defines at least one function call parameter of the interoperability framework for the IoT management system.

20. The computing device according to claim 16, wherein the interoperability framework comprises at least one applications programming interface (API) function call between the IoT management system and the IoT object.

* * * * *